(12) United States Patent
Lacy et al.

(10) Patent No.: US 10,739,087 B2
(45) Date of Patent: Aug. 11, 2020

(54) ARTICLE, COMPONENT, AND METHOD OF FORMING AN ARTICLE

(71) Applicant: GENERAL ELECTRIC COMPANY, Schenectady, NY (US)

(72) Inventors: Benjamin Paul Lacy, Greer, SC (US); Sandip Dutta, Greenville, SC (US); David Edward Schick, Greenville, SC (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 101 days.

(21) Appl. No.: 14/847,409

(22) Filed: Sep. 8, 2015

(65) Prior Publication Data
US 2017/0067699 A1   Mar. 9, 2017

(51) Int. Cl.
*F28F 13/06* (2006.01)
*B23P 15/26* (2006.01)
(Continued)

(52) U.S. Cl.
CPC ............... *F28F 13/06* (2013.01); *B23P 15/26* (2013.01); *F01D 5/189* (2013.01); *F01D 5/188* (2013.01);
(Continued)

(58) Field of Classification Search
CPC .......... F28F 13/06; F28F 13/18; F28F 13/185; F01D 5/189; F01D 5/188
(Continued)

(56) References Cited

U.S. PATENT DOCUMENTS

| 4,312,624 A | 1/1982 | Steinhauer, Jr. et al. |
| 5,207,556 A | 5/1993 | Frederick et al. |

(Continued)

FOREIGN PATENT DOCUMENTS

| EP | 0 182 588 A1 | 5/1986 |
| EP | 0 599 055 A1 | 6/1994 |

(Continued)

OTHER PUBLICATIONS

Extended European Search Report and Opinion issued in connection with related EP Application No. 16164625.2 dated Aug. 29, 2016.
(Continued)

*Primary Examiner* — Joel M Attey
(74) *Attorney, Agent, or Firm* — McNees Wallace & Nurick LLC

(57) ABSTRACT

An article and method of forming an article are provided. The article includes a body portion separating an inner region and an outer region, an aperture in the body portion, the aperture fluidly connecting the inner region and the outer region, and a baffle extending along at least a portion of an inner surface of the article, the baffle dividing the inner region into a plurality of sub-regions. The method of forming an article includes forming a body portion defining an inner region and an outer region, forming an aperture in the body portion, the aperture fluidly connecting the inner region to the outer region, and forming at least one baffle extending along at least a portion of an inner surface of the body portion, the at least one baffle dividing the inner region into a plurality of sub-regions. Also provided is a component including a cooling article disposed therein.

18 Claims, 6 Drawing Sheets

(51) Int. Cl.
*F01D 5/18* (2006.01)
*F28F 13/18* (2006.01)

(52) U.S. Cl.
CPC .... *F05D 2230/22* (2013.01); *F05D 2260/201* (2013.01); *F28F 13/18* (2013.01)

(58) Field of Classification Search
USPC .......................................................... 165/100
See application file for complete search history.

(56) References Cited

U.S. PATENT DOCUMENTS

| | | | |
|---|---|---|---|
| 5,464,322 A | 11/1995 | Cunha et al. | |
| 5,623,827 A * | 4/1997 | Monty | F23R 3/10 60/747 |
| 5,762,471 A * | 6/1998 | Cunha | F01D 5/189 415/115 |
| 5,772,398 A | 6/1998 | Noiret et al. | |
| 6,000,908 A | 12/1999 | Bunker | |
| 6,237,344 B1 | 5/2001 | Lee | |
| 6,391,251 B1 | 5/2002 | Keicher et al. | |
| 7,246,993 B2 | 7/2007 | Bolms et al. | |
| 7,556,476 B1 * | 7/2009 | Liang | F01D 5/188 415/115 |
| 7,789,125 B2 | 9/2010 | Mayer et al. | |
| 8,127,552 B2 | 3/2012 | Schumacher et al. | |
| 8,137,056 B2 | 3/2012 | Fujimoto et al. | |
| 8,152,468 B2 | 4/2012 | Propheter-Hinckley et al. | |
| 8,444,376 B2 | 5/2013 | Krueckels et al. | |
| 8,683,814 B2 * | 4/2014 | Xu | F01D 5/186 415/115 |
| 2004/0226701 A1 * | 11/2004 | Lomax, Jr. | F28D 7/1653 165/159 |
| 2007/0169992 A1 | 7/2007 | Wasif et al. | |
| 2009/0324385 A1 | 12/2009 | Liang | |
| 2010/0124485 A1 * | 5/2010 | Tibbott | F01D 5/188 415/115 |
| 2010/0254824 A1 * | 10/2010 | Naik | F01D 5/186 416/97 R |
| 2011/0123351 A1 * | 5/2011 | Hada | F01D 5/189 416/97 R |
| 2013/0081401 A1 | 4/2013 | Kim | |
| 2013/0156549 A1 | 6/2013 | Maldonado | |
| 2014/0064913 A1 | 3/2014 | Adavikolanu et al. | |
| 2014/0093379 A1 | 4/2014 | Tibbott et al. | |
| 2014/0093392 A1 * | 4/2014 | Tibbott | F01D 5/189 416/97 R |
| 2014/0099476 A1 | 4/2014 | Subramanian et al. | |

FOREIGN PATENT DOCUMENTS

| | | |
|---|---|---|
| EP | 0 698 725 A2 | 2/1996 |
| EP | 0 887 515 A1 | 12/1998 |
| EP | 2 256 297 B1 | 12/2010 |
| EP | 2 369 235 A2 | 9/2011 |
| EP | 2 708 296 A2 | 3/2014 |
| EP | 2 716 868 A2 | 4/2014 |
| EP | 2 853 323 A2 | 4/2015 |
| GB | 2 492 374 A | 1/2013 |
| JP | 2011-089461 A | 5/2011 |
| JP | 2012-202342 A | 10/2012 |
| WO | 03/062607 A1 | 7/2003 |
| WO | 2013/160198 A1 | 10/2013 |
| WO | 2015/042009 A1 | 3/2015 |
| WO | 2015/112384 A1 | 7/2015 |

OTHER PUBLICATIONS

Extended European Search Report and Opinion issued in connection with related EP Application No. 16169984.8 dated Sep. 27, 2016.
Lacy et al., Apr. 16, 2015, U.S. Appl. No. 14/688,436.
Lacy et al., Sep. 8, 2015, U.S. Appl. No. 14/847,347.
Lacy et al., May 29, 2015, U.S. Appl. No. 14/725,374.
Lacy et al., Sep. 8, 2015, U.S. Appl. No. 14/847,445.
Extended European Search Report and Opinion issued in connection with related EP Application No. 16185770.1 dated Jan. 5, 2017.
Extended European Search Report and Opinion issued in connection with related EP Application No. 16187171.0 dated Apr. 13, 2017.
Extended European Search Report and Opinion issued in connection with related EP Application No. 16187452.4 dated Apr. 13, 2017.

* cited by examiner

US 10,739,087 B2

ARTICLE, COMPONENT, AND METHOD OF FORMING AN ARTICLE

STATEMENT REGARDING FEDERALLY SPONSORED RESEARCH

This invention was made with government support under contract number DE-FC26-05NT42643 awarded by the Department of Energy. The government has certain right in this invention.

FIELD OF THE INVENTION

The present invention is directed to an article, a component, and a method of forming an article. More particularly, the present invention is directed to a cooling article, a cooled component, and a method of forming a cooling article.

BACKGROUND OF THE INVENTION

Turbine systems are continuously being modified to increase efficiency and decrease cost. One method for increasing the efficiency of a turbine system includes increasing the operating temperature of the turbine system. To increase the temperature, the turbine system must include components which can withstand such temperatures during continued use.

In addition to modifying component materials and coatings, one common method of increasing the temperature capability of a turbine component includes supplying a flow of cooling fluid. Often, to supply the cooling fluid flow, relatively cooler air is diverted from the compressor and provided to the component(s) to be cooled. In certain components, an impingement sleeve is positioned within the component, the impingement sleeve directing the cooler air towards an inner surface of the component.

Generally, impingement sleeves are open single plenum devices including a plurality of cooling holes formed therein. The cooler air fills the plenum of the impingement sleeve and then passes through the plurality of cooling holes. Typically, in order to control cooling flow from the impingement sleeve, the individual cooling hole count/size is changed to increase/decrease flows to certain zones. However, reducing cooling hole size can result in plugging while decreasing cooling hole count may reduce the effective coverage of the impingement cooling.

An article and method of forming an article that show one or more improvements in comparison to the prior art would be desirable in the art.

BRIEF DESCRIPTION OF THE INVENTION

In an embodiment, an article includes a body portion separating an inner region and an outer region, an aperture in the body portion, the aperture fluidly connecting the inner region and the outer region, and a baffle extending along at least a portion of an inner surface of the article, the baffle dividing the inner region into a plurality of sub-regions.

In another embodiment, a component includes a hollow component body having a cooling article disposed therein, the cooling article comprising a body portion separating an inner region and an outer region, an aperture fluidly connecting the inner region and the outer region, and at least one baffle extending along at least a portion of an inner surface of the cooling article, the at least one baffle dividing the inner region into a plurality of sub-regions. The at least one baffle is arranged and disposed to distribute fluid flow between one or more of the plurality of sub-regions.

In another embodiment, a method of forming an article includes forming a body portion defining an inner region and an outer region, forming an aperture in the body portion, the aperture fluidly connecting the inner region to the outer region, and forming at least one baffle extending along at least a portion of an inner surface of the body portion, the at least one baffle dividing the inner region into a plurality of sub-regions.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are a cooling article and a method of forming a cooling article. Embodiments of the present disclosure, for example, in comparison to concepts failing to include one or more of the features disclosed herein, increase cooling efficiency, facilitate control of fluid flow, distribute fluid flow within a cooling article, facilitate adjusting impingement flow without modifying apertures in the cooling article, increase component cooling, facilitate use of increased operating temperatures, facilitate formation of cooling articles using additive manufacturing, provide increased cooling with a decreased amount of fluid flow, or a combination thereof.

Figure 1:
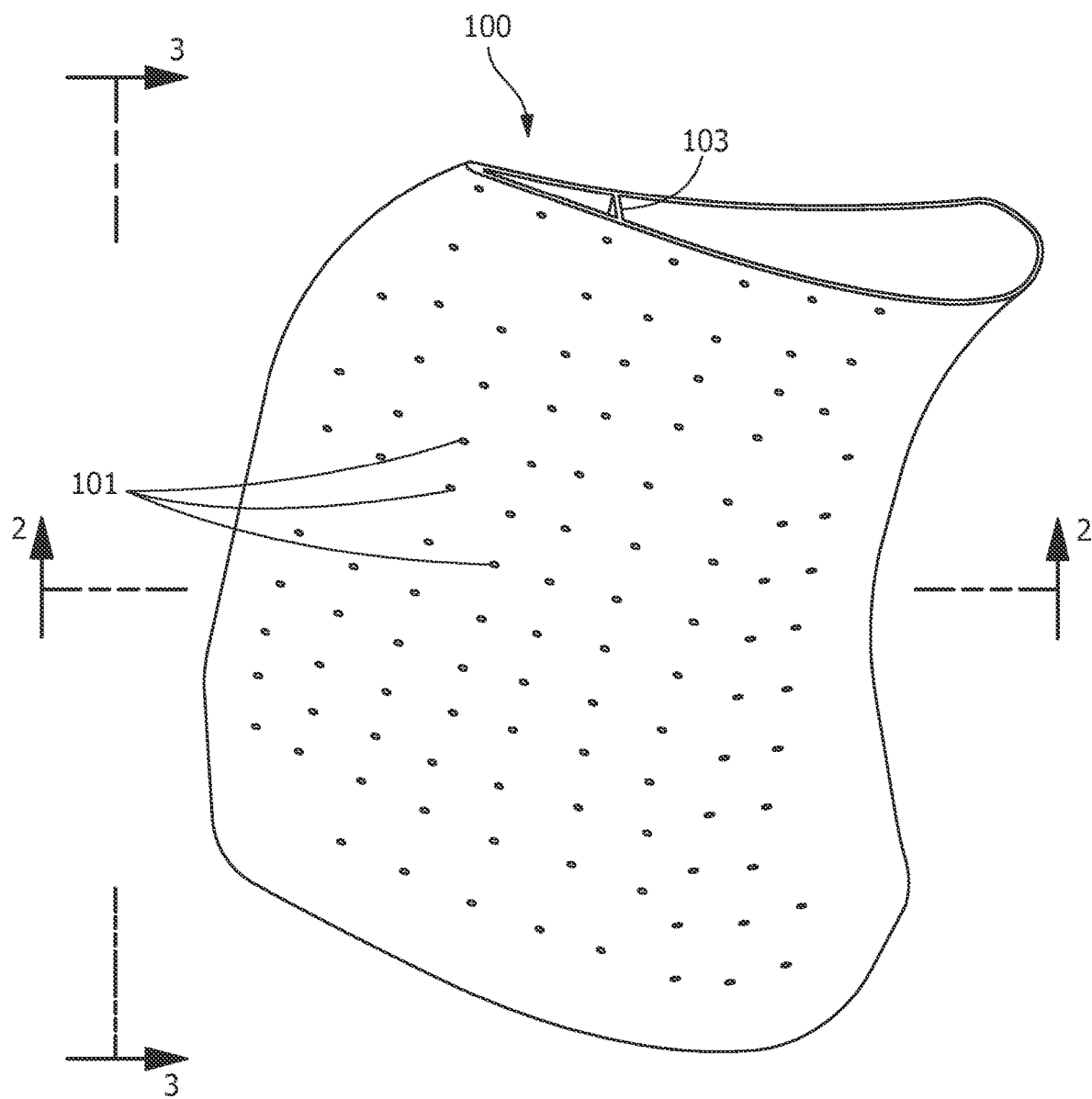
FIG. 1 is a perspective view of a cooling article, according to an embodiment of the disclosure.

A cooling article 100 includes any suitable article for facilitating cooling of a turbine component. In one embodiment, as illustrated in FIG. 1, the cooling article 100 includes one or more apertures 101 formed therein and/or one or more baffles 103 formed therein. For example, in another embodiment, the cooling article 100 includes an impingement sleeve having a plurality of apertures 101. Although primarily described herein with regard to an impingement sleeve, as will be understood by those skilled in the art, the cooling article 100 may include any other suitable article, such as, but not limited to, an impingement plate, multiple impingement plates, any other article configured for insertion within a component, or a combination thereof.

Figure 2:
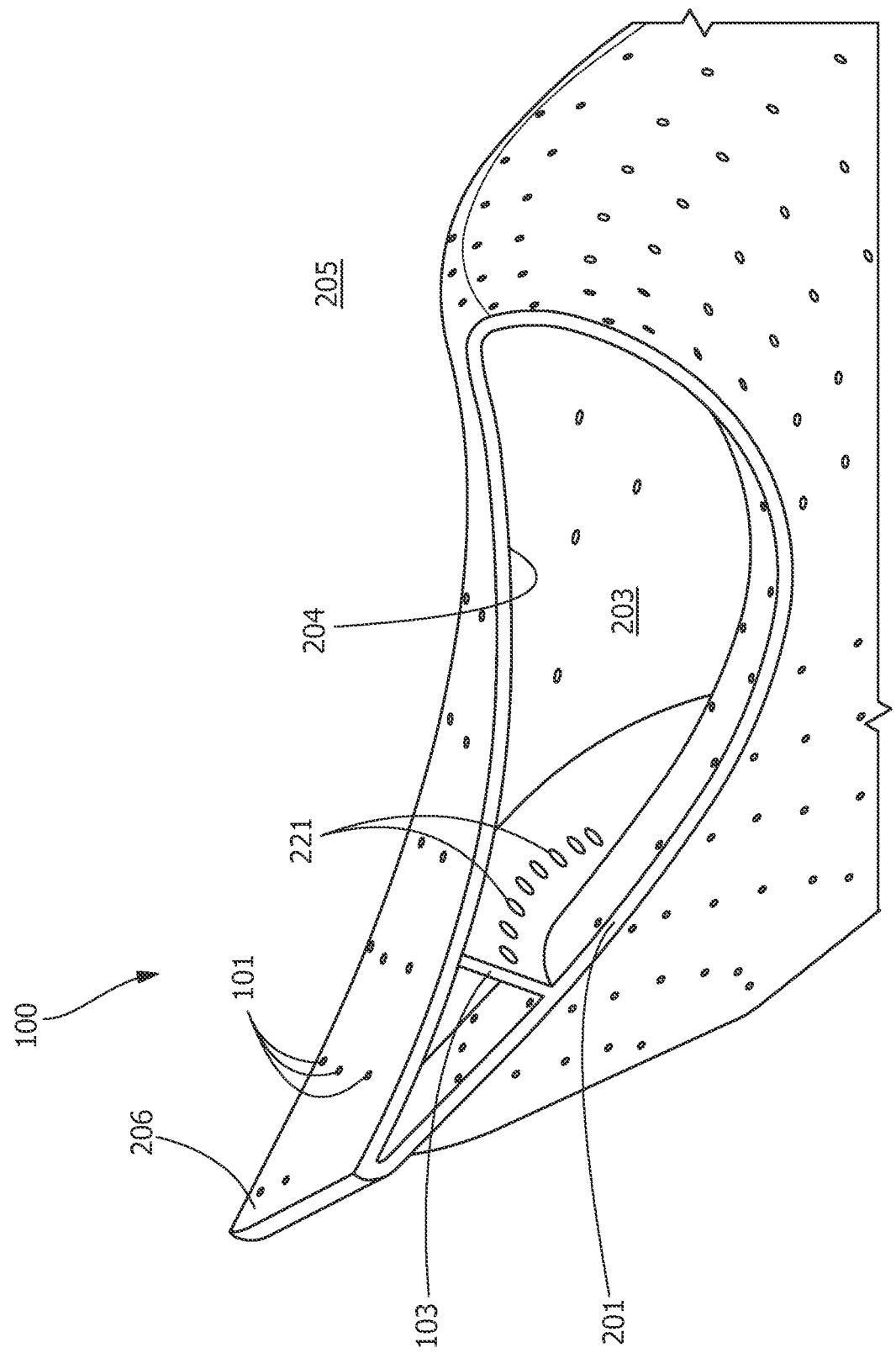
FIG. 2 is a section view of a cooling article taken in direction 2-2 as shown in FIG. 1, according to an embodiment of the disclosure.

Referring to FIG. 2, a body portion 201 of the cooling article 100 defines and/or separates an inner region 203 and an outer region 205. The body portion 201 includes an inner surface 204, which faces the inner region 203, and an outer surface 206, which faces the outer region 205. In one embodiment, the one or more apertures 101 are formed in the body portion 201, fluidly connecting the inner region 203 to the outer region 205 and providing fluid flow between the inner region 203 and the outer region 205. For example, the apertures 101 may extend between the inner surface 204 and the outer surface 206, facilitating a flow of cooling fluid from the inner region 203 to the outer region 205.

Each of the apertures 101 includes any suitable geometry for fluidly connecting the inner region 203 and the outer region 205. Suitable geometries include, but are not limited to, circular, substantially circular, round, substantially round, oval, non-round, square, triangular, star shaped, polygonal, varied, irregular, any other geometrical shape, or a combination thereof. Additionally, the apertures 101 include any suitable orientation and/or spacing for facilitating cooling flow. Suitable spacing between the apertures 101 includes, but is not limited to, even, uniform, varied, gradient, sectioned, or a combination thereof. The geometry and/or spacing of the apertures 101 may be uniform, substantially uniform, or varied throughout the cooling article 100, with the geometry and/or spacing of each of the apertures 101 being the same, substantially the same, and/or different from one or more other apertures 101 in the cooling article 100.

Figure 3:
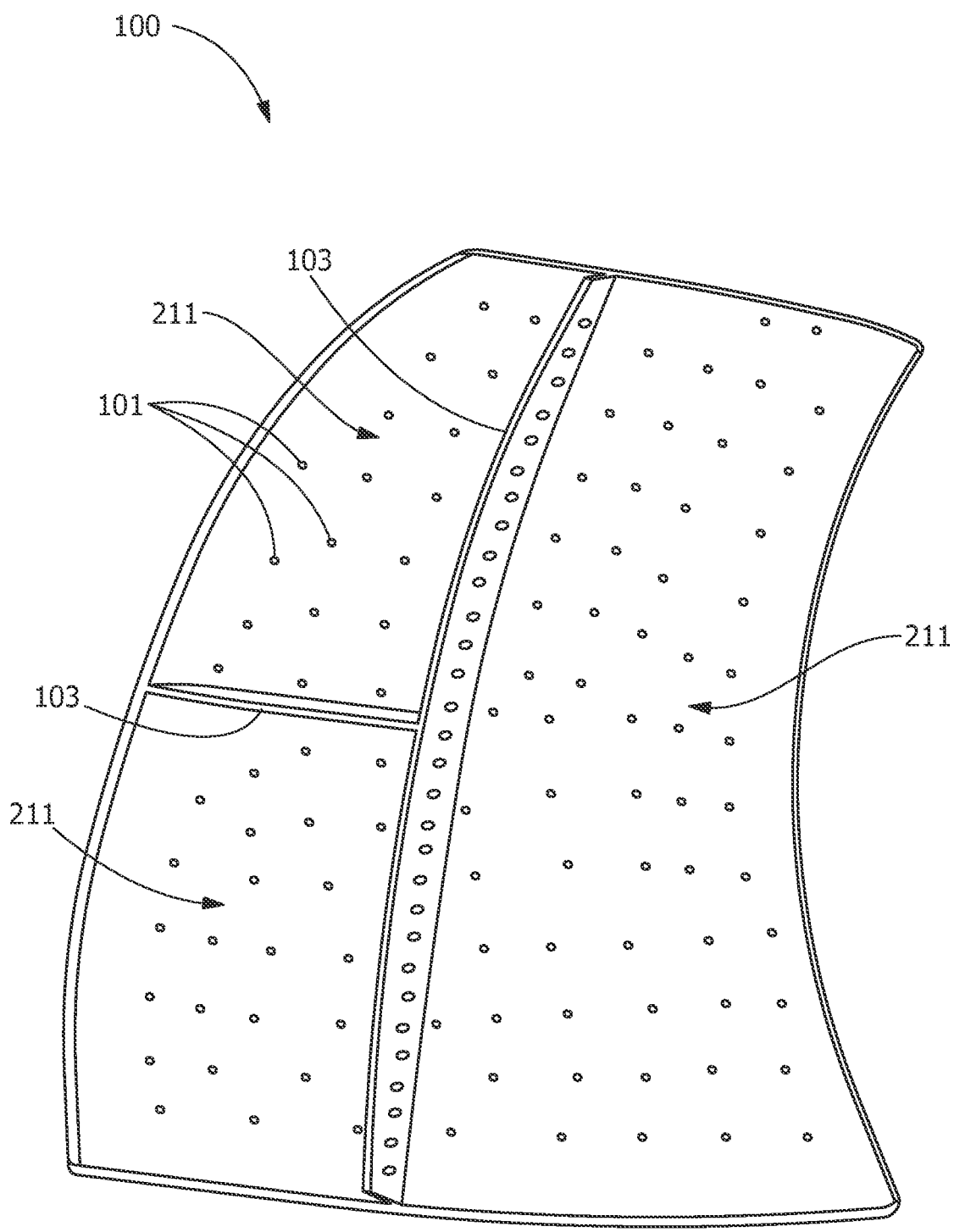
FIG. 3 is a section view of a cooling article taken in direction 3-3 as shown in FIG. 1, according to an embodiment of the disclosure.

The one or more baffles 103 is/are positioned along the inner surface 204 of the cooling article 100, dividing the inner region 203 into one or more sub-regions 211. Each of the one or more baffles 103 extends in any suitable direction, such as, but not limited to, axially, substantially axially, radially, substantially radially, or a combination thereof. The amount, positioning, and/or orientation of the one or more baffles 103 is selected to provide a desired configuration of the sub-regions 211, such as, for example, to provide controlled pressure and/or cooling air flow. In one embodiment, as illustrated in FIG. 2, a single baffle 103 is secured to the inner surface 204, the single baffle 103 dividing the inner region 203 into one or more of the sub-regions 211. In another embodiment, as illustrated in FIG. 3, at least two baffles 103 are secured to the inner surface 204, the at least two baffles 103 dividing the inner region 203 into one or more of the sub-regions 211. As will be appreciated by those skilled in the art, any suitable number of baffles 103 may be provided to form any suitable number of sub-regions 211 within the inner region 203.

The one or more baffles 103 are configured to distribute fluid flow within the inner region 203 of the cooling article 100. The distributing of the fluid flow within the inner region 203 includes, but is not limited to, introducing varying amounts of fluid to the sub-regions 211 formed by the baffle(s) 103, varying an orientation of the baffle(s) 103 to vary the fluid flow in one zone relative to another, varying an orientation of the baffle(s) 103 to concentrate fluid flow within one or more of the sub-regions 211, varying fluid flow through the one or more baffles 103, or a combination thereof. For example, in one embodiment, at least one of the baffles 103 includes a porous structure 403 (see FIG. 4), such as a mesh or mesh weave. The porous structure 403 includes a plurality of holes and/or passages that permit fluid flow directly through the porous structure 403. In another embodiment, one or more openings 221 are formed in the baffle(s) 103. The one or more openings 221 may be formed in the porous structure 403, in a non-porous structure, such as a plate (see FIG. 2), or a combination thereof. The one or more openings 221 in the non-porous structure provide fluid flow therethrough, while the one or more openings 221 in the porous structure 403 increase an amount of fluid flow therethrough. Varying a size, orientation, and/or amount of the openings in the baffle(s) 103, and/or varying a porosity of the porous structure 403, when present, varies the fluid flow through the baffle(s) 103, which varies the fluid flow within the inner region 203. Additionally or alternatively, the baffle(s) 103 may include flow restrictor and/or flow preventers that modify and/or control fluid flow through the baffle(s) 103 and/or sub-regions 211. Suitable flow restrictors and/or flow preventers include, but not limited to, pin banks, brush bristles, or a combination thereof.

In one embodiment, the one or more baffles 103 vary a distribution of fluid flow between one or more of the sub-regions 211. In another embodiment, varying the distribution of fluid flow between one or more of the sub-regions 211 varies fluid flow through the apertures 101 corresponding to the one or more sub-regions 211. For example, in a further embodiment, the one or more baffles 103 are positioned to provide increased fluid flow within one of the sub-regions 211, as compared to another sub-region 211, the increased fluid flow within the sub-region 211 providing increased fluid flow through the apertures 101 in the sub-region 211.

Figure 4:
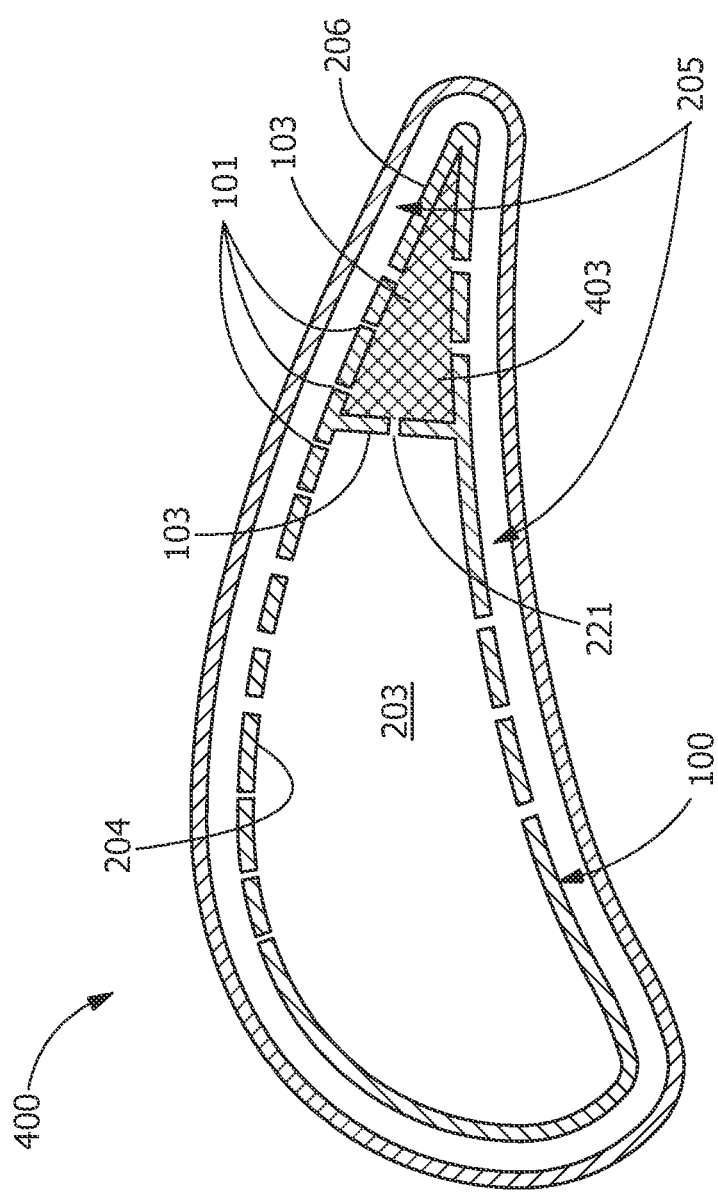
FIG. 4 is a section view of a cooling article positioned within a component, according to an embodiment of the disclosure.

Turning to FIG. 4, in one embodiment, the cooling article 100 is configured for insertion and/or positioning within a component 400. The component 400 includes any suitable component, such as, but not limited to, a hollow component, a hot gas path component, a nozzle, a blade, a vane, or a combination thereof. When inserted and/or positioned within the component 400, the outer region 205 of the cooling article 100 extends between the outer surface 206 of the cooling article and an inner surface 404 of the component 400. Additionally, when the cooling article 100 is inserted and/or positioned within the component 400, the flow of fluid through the apertures 101 provides impingement cooling of the component 400. For example, a cooling fluid provided to the inner region 203 of the cooling article 100 may pass through the apertures 101 to the outer region 205 where the cooling fluid contacts the inner surface 404 of the component 400 to cool the component 400. The orientation and/or spacing of the apertures 101 at least partially determines an amount, direction, and/or concentration of the fluid passing from the inner region 203 to the outer region 205. Additionally or alternatively, the baffle(s) 103 and/or sub-regions 211 are arranged to modify, adjust, and/or control the fluid flow from the inner region 203 to the outer region 205. For example, the baffle(s) 103 and/or sub-regions 211 may be configured to provide a desired fluid flow profile through the apertures 101. Suitable fluid flow profiles include, but are not limited to, increased fluid flow in difficult to reach areas, increased fluid flow in areas exposed to increased temperatures, increased fluid flow in other areas where increased cooling is desired, or a combination thereof.

By distributing fluid flow within the inner region 203 and/or varying the distribution of fluid flow between the sub-regions 211, the baffle(s) 103 vary fluid flow through the apertures 101 without adjusting and/or modifying a number, size, and/or geometry of the apertures 101, without using multiple cooling articles 100, or a combination thereof. For example, in one embodiment, the baffle(s) 103 provide flow control independent of the number, size, geometry, and/or placement of the apertures 101. In another embodiment, the independent flow control provided by the baffle(s) 103 facilitates use of desired parameter for the apertures 101 without or substantially without plugging the apertures 101. Additionally or alternatively, the baffle(s) 103 facilitate increased control over fluid flow, facilitate increased control over impingement cooling flow, provide increased cooling with a decreased amount of fluid flow, increase cooling efficiency, facilitate use of increased operating temperatures, or a combination thereof, as compared to cooling articles not including the baffle(s) 103 as described in one or more of the embodiments disclosed herein.

Figure 5:
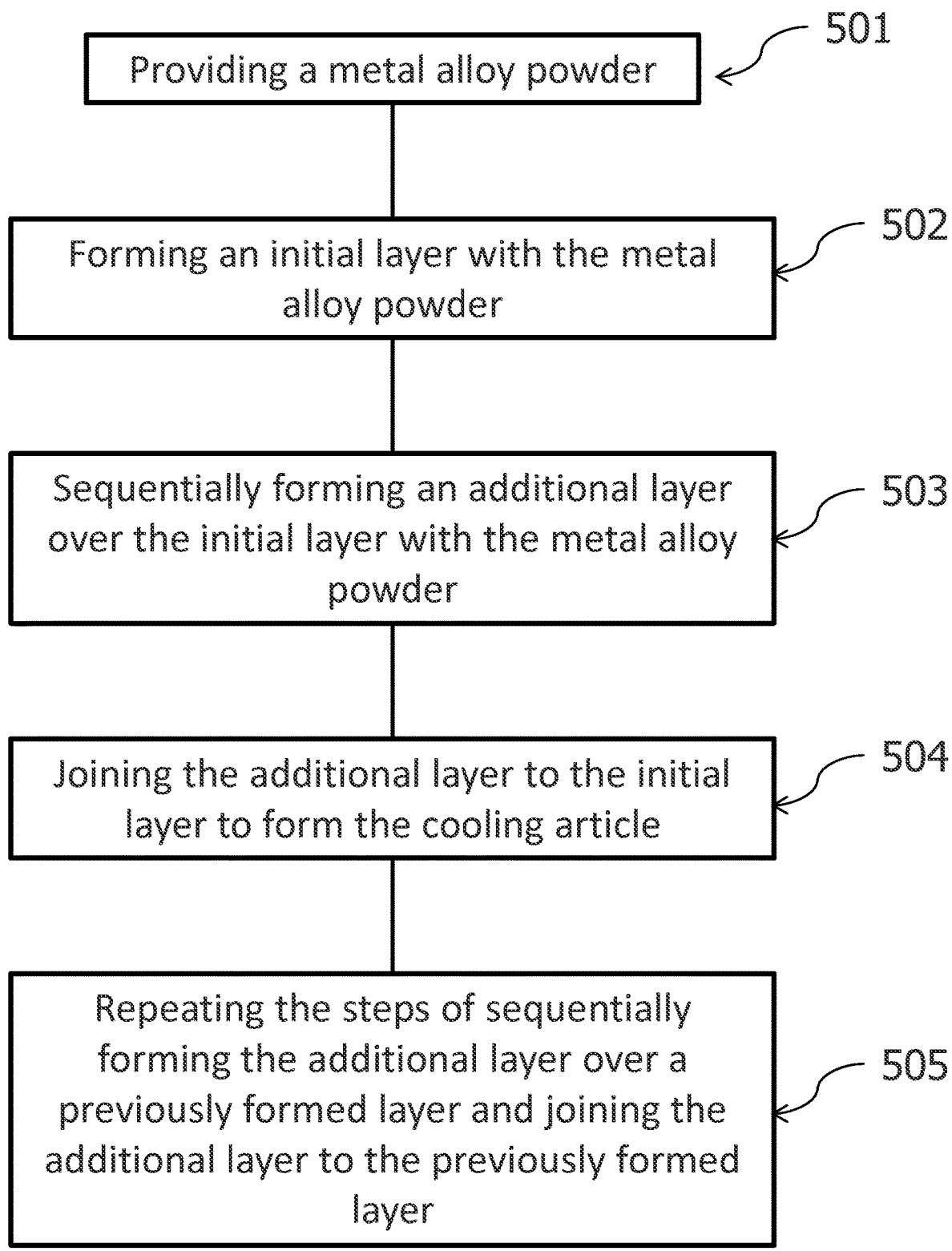
FIG. 5 is a process view of a method of forming a cooling article, according to an embodiment of the disclosure.
Figure 6:
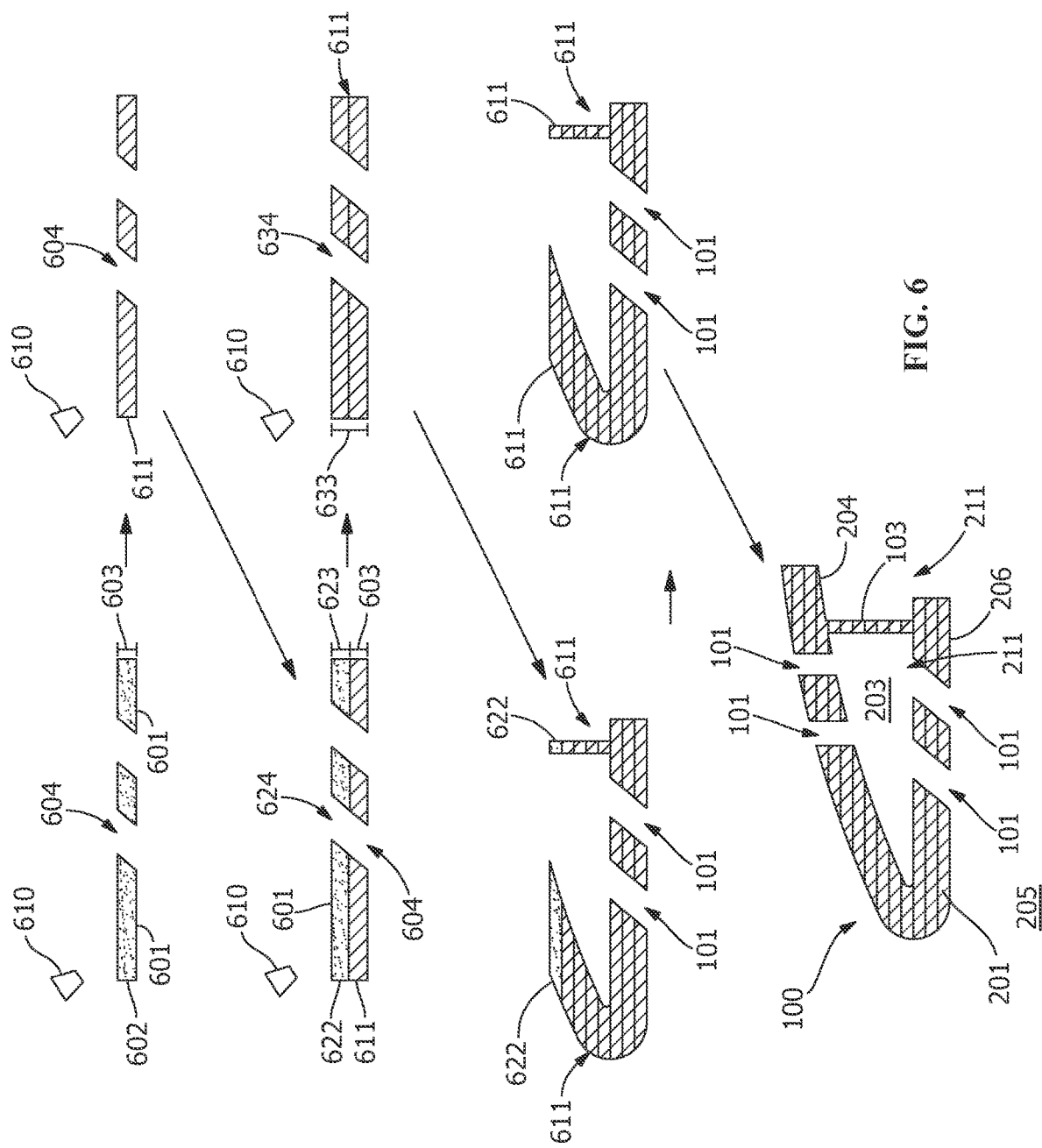
FIG. 6 is a schematic view of a method of forming a cooling article, according to an embodiment of the disclosure.

In one embodiment, forming the cooling article 100 and/or the baffle 103 includes any suitable additive manufacturing method. Referring to FIGS. 5-6, in one embodiment, the additive method 500 includes making and/or forming net or near-net shape cooling articles 100 and/or baffle 103. As used herein, the phrase "near-net" refers to the cooling article 100 and/or baffle(s) 103 being formed with a geometry and size very similar to the final geometry and size of the cooling article 100 and/or baffle(s) 103, requiring little or no machining and processing after the additive method 500. As used herein, the phrase "net" refers to the cooling article 100 and/or baffle(s) 103 being formed with a geometry and size requiring no machining and processing.

According to one or more of the embodiments disclosed herein, the additive method 500 includes integrally forming the one or more aperture 101 and/or the one or more baffle 103 integral with the cooling article 100. Additionally or alternatively, the additive method 500 includes forming the one or more baffle 103 separate from the cooling article 100, then securing the one or more baffle 103 to the cooling article 100. Securing the one or more baffle 103 to the cooling article 100 includes, but is not limited to, welding, brazing, sintering, joining, interlocking, mechanically locking, or a combination thereof. Although described with regard to the aperture(s) 101 being formed during the additive method 500, as will be appreciated by those skilled in the art, at least one of the aperture(s) 101 may be machined into the cooling article 100 after the additive method 500, without affecting the net or near-net geometry of the cooling article 100.

The additive method 500 includes any manufacturing method for forming the cooling article 100 and/or baffle(s) 103 through sequentially and repeatedly depositing and joining material layers. Suitable manufacturing methods include, but are not limited to, the processes known to those of ordinary skill in the art as Direct Metal Laser Melting (DMLM), Direct Metal Laser Sintering (DMLS), Laser Engineered Net Shaping, Selective Laser Sintering (SLS), Selective Laser Melting (SLM), Electron Beam Melting (EBM), Fused Deposition Modeling (FDM), or a combination thereof. In one embodiment, for example, the additive method 500 includes providing a metal alloy powder 601 (step 501); forming an initial layer 602 with the metal alloy powder 601 (step 502); sequentially forming an additional layer 622 over the initial layer 602 with the metal alloy powder 601 (step 503); and joining the additional layer 622 to the initial layer 602 to form the cooling article 100 and/or baffle(s) 103 (step 504). In another embodiment, the additive method 500 includes repeating the steps of sequentially forming the additional layer 622 over a previously formed layer and joining the additional layer 622 to the previously formed layer (step 505) until the cooling article 100 and/or baffle(s) 103 having a predetermined thickness and/or a predetermined shape are obtained. The previously formed layer includes any portion 611 of the cooling article 100 and/or baffle(s) 103 including the initial layer 602 and/or any other additional layer(s) 622 directly or indirectly joined to the initial layer 602.

The initial layer 602 includes a preselected thickness 603 and a preselected shape, which, when forming the one or more apertures 101, includes at least one first opening 604. Each of the additional layers 622 includes a second preselected thickness 623 and a second preselected shape, the second preselected shape including at least one second opening 624 corresponding to the at least one first opening 604 in the initial layer 602, a shape corresponding to the outer surface 206, and/or a shape corresponding to the one or more baffles 103. The second preselected thickness 623 and/or the second preselected shape may be the same, substantially the same, or different between one or more of the additional layers 622. When joined, the preselected thickness 603 of the initial layer 602 and the second preselected thickness 623 of the additional layer(s) 622 form a combined thickness 633 of the portion 611. Additionally, the at least one first opening 604 and the corresponding at least one second opening 624 form one or more combined openings 634 in the portion 611. Once the cooling article 100 is formed, the one or more combined opening 634 form the one or more apertures 101 fluidly connecting the inner region 203 to the outer region 205 of the cooling article 100.

In one embodiment, the additive method 500 includes the DMLM process. In another embodiment, the DMLM process includes providing the metal alloy powder 601 and depositing the metal alloy powder 601 to form an initial powder layer. The initial powder layer has the preselected thickness 603 and the preselected shape including the at least one first opening 604. In a further embodiment, the DMLM process includes providing a focused energy source 610, and directing the focused energy source 610 at the initial powder layer to melt the metal alloy powder 601 and transform the initial powder layer to the portion 611 of the cooling article 100 and/or baffle(s) 103. Suitable focused energy sources include, but are not limited to, laser device, an electron beam device, or a combination thereof.

Next, the DMLM process includes sequentially depositing additional metal alloy powder 601 over the portion 611 of the cooling article 100 and/or baffle(s) 103 to form the additional layer 622 having the second preselected thickness 623 and the second preselected shape. After depositing the additional layer 622 of the metal alloy powder 601, the DMLM process includes melting the additional layer 622 with the focused energy source 610 to increase the combined thickness 633 and form at least a portion of the cooling article 100. The steps of sequentially depositing the additional layer 622 of the metal alloy powder 601 and melting the additional layer 622 may then be repeated to form the net or near-net shape cooling article 100 and/or baffle(s) 103. For example, the steps may be repeated until the cooling article 100 having the predetermined thickness, the predetermined shape, the one or more apertures 101, and/or the one or more baffle(s) 103 is obtained.

Additionally or alternatively, the one or more baffles 103 may be formed separately from and/or after the forming of the cooling article 100. For example, the baffle(s) 103 may be formed directly on a previously formed cooling article 100 using the additive method 500, or the baffle(s) 103 may be formed separate from the cooling article 100 then attached to the cooling article 100. Forming the baffle(s) 103 separate from the cooling article 100 may include either the additive method 500 or a non-additive method, such as, machining, sintering, and/or casting. The forming of the cooling article 100 and/or baffle(s) 103 using the additive method 500 facilitates the formation of baffle(s) 103 having increased complexity as compared to non-additive methods. Additionally or alternatively, when one or more of the baffles 103 are formed during the additive manufacturing of the cooling article 100, the baffle(s) 103 may provide support to the cooling article 100, facilitating formation of the body portion 201 having a decreased thickness, facilitating formation of longer and/or taller cooling articles 100, decreasing or eliminating deformation of the cooling article 100 during manufacturing, maintaining a desired geometry of the cooling article 100, or a combination thereof.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. An impingement sleeve, comprising:
   a body portion separating an inner region and an outer region;
   an aperture in the body portion, the aperture fluidly connecting the inner region and the outer region; and
   at least two baffles spanning the inner region and extending from a first portion of an inner surface of the impingement sleeve to a second portion of the inner surface;
   wherein the impingement sleeve is arranged and disposed with a geometry that permits insertion within a hollow portion of a hot gas path component selected from the group consisting of a nozzle, a blade, and a vane of a gas turbine;
   wherein at least one of the at least two baffles includes at least one opening extending therethrough; and
   wherein the impingement sleeve at least partially conforms to the shape of the hollow portion of the hot gas path component.

2. The impingement sleeve of claim 1, wherein the baffles distribute fluid flow within the inner region.

3. The impingement sleeve of claim 1, wherein the baffles are arranged and disposed to provide support to the article.

4. The impingement sleeve of claim 1, wherein the at least two baffles extend in a direction selected from group consisting of axially, substantially axially, radially, substantially radially, and combinations thereof.

5. The impingement sleeve of claim 1, wherein the at least two baffles are selected from the group consisting of a mesh weave, a porous plate, a series of flow preventers, and combinations thereof.

6. The impingement sleeve of claim 1, wherein the baffle increases cooling efficiency.

7. The impingement sleeve of claim 1, wherein the at least two baffles are arranged and disposed to define a plurality of sub-regions and to vary fluid flow in one or more sub-regions relative to another one of the plurality of sub-regions.

8. The impingement sleeve of claim 1, wherein one of the two baffles is independently secured to the impingement sleeve.

9. A component, comprising:
   a nozzle, blade or vane of a gas turbine having a cooling article insertably disposed therein, the cooling article comprising:
   a body portion separating an inner region and an outer region;
   an aperture fluidly connecting the inner region and the outer region; and
   at least two baffles spanning the inner region and extending from a first portion of an inner surface of the cooling article to a second portion of the inner surface;
   wherein the at least two baffles are arranged and disposed to distribute fluid flow between two or more of a plurality of inner sub-regions and
   wherein:
   at least one of the at least two baffles includes at least one opening extending therethrough;
   the at least two baffles are arranged and disposed to vary fluid flow in the plurality of inner sub-regions relative to another one of the plurality of inner sub-regions such that fluid flow through a first portion of the plurality of apertures fluidly connecting the outer region with the inner region of a first inner sub-region is increased relative to fluid flow through a second portion of the plurality of apertures fluidly connecting the outer region with the inner region of a second inner sub-region; or both.

10. The component of claim 9, wherein the cooling article is an impingement sleeve.

11. The component of claim 9, wherein the at least one of the at least two baffles includes the at least one opening extending therethrough.

12. The component of claim 11, wherein the at least two baffles are selected from the group consisting of a mesh weave, a porous plate, a series of flow preventers, and combinations thereof.

13. The component of claim 9, wherein the at least two baffles are arranged and disposed to distribute fluid flow between three or more of the plurality of inner sub-regions.

14. An impingement sleeve, comprising:
   a body portion separating an inner region and an outer region;
   a plurality of apertures in the body portion, the plurality of apertures fluidly connecting the inner region and the outer region; and
   at least two baffles spanning the inner region and extending from a first portion of an inner surface of the impingement sleeve to a second portion of the inner surface;
   wherein the impingement sleeve is arranged and disposed with a geometry that permits insertion within a hollow portion of a hot gas path component selected from the group consisting of a nozzle, a blade, and a vane of a gas turbine;
   wherein the at least two baffles are arranged and disposed to vary fluid flow in a plurality of sub-regions relative to another one of the plurality of sub-regions such that fluid flow through a first portion of the plurality of apertures fluidly connecting the outer region with the inner region of a first sub-region is increased relative to fluid flow through a second portion of the plurality of apertures fluidly connecting the outer region with the inner region of a second sub-region; and wherein the impingement sleeve at least partially conforms to the shape of the hollow portion of the hot gas path component.

15. The impingement sleeve of claim 14, wherein at least one of the at least two baffles is independently secured to the impingement sleeve.

16. The impingement sleeve of claim 14, wherein the at least two baffles are selected from the group consisting of a mesh weave, a porous plate, a series of flow preventers, and combinations thereof.

17. The impingement sleeve of claim 16, wherein at least one of the at least two baffles includes the mesh weave.

18. The impingement sleeve of claim 16, wherein at least one of the at least two baffles includes the porous plate.

* * * * *